(12) United States Patent
Han et al.

(10) Patent No.: US 9,997,822 B2
(45) Date of Patent: *Jun. 12, 2018

(54) WIRELESS COMMUNICATION DEVICE WITH AN ANTENNA ADJACENT TO AN EDGE OF THE DEVICE

(71) Applicant: Futurewei Technologies, Inc., Plano, TX (US)

(72) Inventors: Chul Min Han, San Diego, CA (US); Jorge Fabrega Sanchez, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/263,559

(22) Filed: Sep. 13, 2016

(65) Prior Publication Data
US 2016/0380341 A1 Dec. 29, 2016

Related U.S. Application Data

(63) Continuation of application No. 15/059,588, filed on Mar. 3, 2016, now Pat. No. 9,462,096, which is a (Continued)

(51) Int. Cl.
*H01Q 1/24* (2006.01)
*H01Q 13/10* (2006.01)
(Continued)

(52) U.S. Cl.
CPC ............. *H01Q 1/243* (2013.01); *H01Q 1/50* (2013.01); *H01Q 13/10* (2013.01);
(Continued)

(58) Field of Classification Search
USPC .......................................... 343/702, 700 MS
See application file for complete search history.

(56) References Cited

U.S. PATENT DOCUMENTS

| | | | |
|---|---|---|---|
| 6,762,723 B2 * | 7/2004 | Nallo | H01Q 1/243 343/700 MS |
| 7,034,762 B2 * | 4/2006 | Huang | G06F 1/1626 343/702 |

(Continued)

OTHER PUBLICATIONS

"iPhone 4 Technical Specifications," http://www.apple.com/iphone/specs.html, downloaded Sep. 29, 2011, total 3 pages.

*Primary Examiner* — Jessica Han
*Assistant Examiner* — Hai Tran
(74) *Attorney, Agent, or Firm* — Yeh Kurt Chang

(57) ABSTRACT

A wireless communication device comprising a housing comprising a plurality of edges and configured to serve as an external surface for the wireless communication device, and an antenna adjacent to at least a first edge of the housing, wherein the antenna comprises at least a conductive strip and at least one slot and wherein the antenna is configured to receive and transmit wireless signals, wherein the first edge of the housing is one of an edge of the housing nearest an ear piece and an edge of the housing that is opposite the edge of the housing nearest the ear piece, and wherein the conductive strip and the slot are adjacent to at least the first edge of the housing.

8 Claims, 10 Drawing Sheets

Related U.S. Application Data continuation of application No. 13/278,836, filed on Oct. 21, 2011, now Pat. No. 9,300,033.

(51) Int. Cl.
  *H01Q 21/29*     (2006.01)
  *H04B 1/3827*    (2015.01)
  *H04M 1/02*      (2006.01)
  *H01Q 1/50*      (2006.01)

(52) U.S. Cl.
  CPC ......... *H01Q 21/293* (2013.01); *H04B 1/3827* (2013.01); *H04M 1/026* (2013.01)

(56) References Cited

U.S. PATENT DOCUMENTS

| | | | |
|---|---|---|---|
| 7,330,155 B2 * | 2/2008 | Chan | H01Q 1/243 343/702 |
| 7,551,142 B1 | 6/2009 | Zhang et al. | |
| 7,642,964 B2 * | 1/2010 | DiNallo | H01Q 1/243 343/700 MS |
| 8,193,993 B2 * | 6/2012 | Maddaleno | H01Q 1/243 343/700 MS |
| 2003/0236658 A1 | 12/2003 | Yam | |
| 2005/0160095 A1 | 7/2005 | Dick et al. | |
| 2005/0280579 A1 | 12/2005 | Liang et al. | |
| 2007/0085747 A1 * | 4/2007 | DiNallo | H01Q 1/243 343/702 |
| 2007/0241971 A1 | 10/2007 | Tsujimura et al. | |
| 2009/0040115 A1 | 2/2009 | Zhang et al. | |
| 2009/0153412 A1 | 6/2009 | Chiang et al. | |
| 2009/0175250 A1 | 7/2009 | Mathur et al. | |
| 2009/0256757 A1 | 10/2009 | Chiang et al. | |
| 2010/0123632 A1 | 5/2010 | Hill et al. | |
| 2010/0149751 A1 * | 6/2010 | Camacho | G06F 1/1616 361/679.55 |
| 2010/0321255 A1 | 12/2010 | Kough et al. | |
| 2011/0133995 A1 * | 6/2011 | Pascolini | H01Q 7/00 343/702 |
| 2011/0241948 A1 | 10/2011 | Bevelacqua et al. | |
| 2011/0241949 A1 | 10/2011 | Nickel et al. | |
| 2011/0291896 A1 | 12/2011 | Pascolini et al. | |
| 2012/0009983 A1 | 1/2012 | Mow et al. | |
| 2012/0112969 A1 | 5/2012 | Caballero et al. | |
| 2012/0112970 A1 | 5/2012 | Caballero et al. | |
| 2012/0157175 A1 * | 6/2012 | Golko | G06F 1/1698 455/575.7 |
| 2012/0176279 A1 | 7/2012 | Merz et al. | |
| 2012/0178382 A1 | 7/2012 | Merz et al. | |
| 2012/0206302 A1 | 8/2012 | Ramachandran et al. | |
| 2012/0229347 A1 | 9/2012 | Jin et al. | |
| 2012/0299785 A1 | 11/2012 | Bevelacqua | |
| 2013/0082883 A1 | 4/2013 | Montevirgen et al. | |

* cited by examiner

WIRELESS COMMUNICATION DEVICE WITH AN ANTENNA ADJACENT TO AN EDGE OF THE DEVICE

CROSS-REFERENCE TO RELATED APPLICATIONS

The present application is a continuation of U.S. patent application Ser. No. 15/059,588 filed on Mar. 3, 2016, now allowed, and entitled "A Wireless Communication Device with an Antenna Adjacent to an Edge of the Device", which is a continuation of U.S. patent application Ser. No. 13/278,836 filed on Oct. 21, 2011, now U.S. Pat. No. 9,300,033, and entitled "A Wireless Communication Device with an Antenna Adjacent to an Edge of the Device", all of which applications are hereby incorporated herein by reference.

BACKGROUND

An antenna can be used to transmit or receive RF signals in the range of about 3 kilohertz to 300 gigahertz. For cellular communications within the United States, the relevant frequency range is between 824 and 2690 megahertz. While numerous types of antennas exist, the use of slot antennas in cellular communication devices is on the rise. A slot antenna consists of a conductive surface, usually a flat metal plate, comprising an aperture or slot of a removed surface portion. The slot radiates electromagnetic (EM) waves when a driving frequency, e.g., RF, is applied to the plate. The shape and size of the antenna, the slot, and the driving frequency determine the radiation distribution pattern.

SUMMARY

In one embodiment, the disclosure includes a wireless communication device comprising a housing comprising a plurality of edges and configured to serve as an external surface for the wireless communication device, and an antenna adjacent to at least a first edge of the housing, wherein the antenna comprises at least a conductive strip and at least one slot and wherein the antenna is configured to receive and transmit wireless signals, wherein the first edge of the housing is one of an edge of the housing nearest an ear piece and an edge of the housing that is opposite the edge of the housing nearest the ear piece, and wherein the conductive strip and the slot are adjacent to at least the first edge of the housing.

In another embodiment, the disclosure includes a method of assembling a wireless communication device comprising forming a housing comprising a plurality of edges to serve as an external surface for the wireless communication device, and forming an antenna comprising at least a conductive strip and at least one slot on the housing such that the conductive strip and the slot are positioned on a first edge wherein the first edge comprises one of an edge of the housing nearest an ear piece and an edge of the housing opposite the edge of the housing nearest the ear piece.

In a third embodiment, the disclosure includes a wireless communication device comprising a housing comprising a plurality of first edges and a plurality of second edges and configured to serve as an external surface for the wireless communication device, wherein the plurality of first edges are longer than the plurality of second edges, and an antenna adjacent to at least one of the plurality of second edges, wherein the antenna comprises at least a conductive strip and at least one slot, wherein the slot is adjacent to the at least one of the plurality of second edges, and wherein the antenna is configured to receive and transmit wireless signals.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
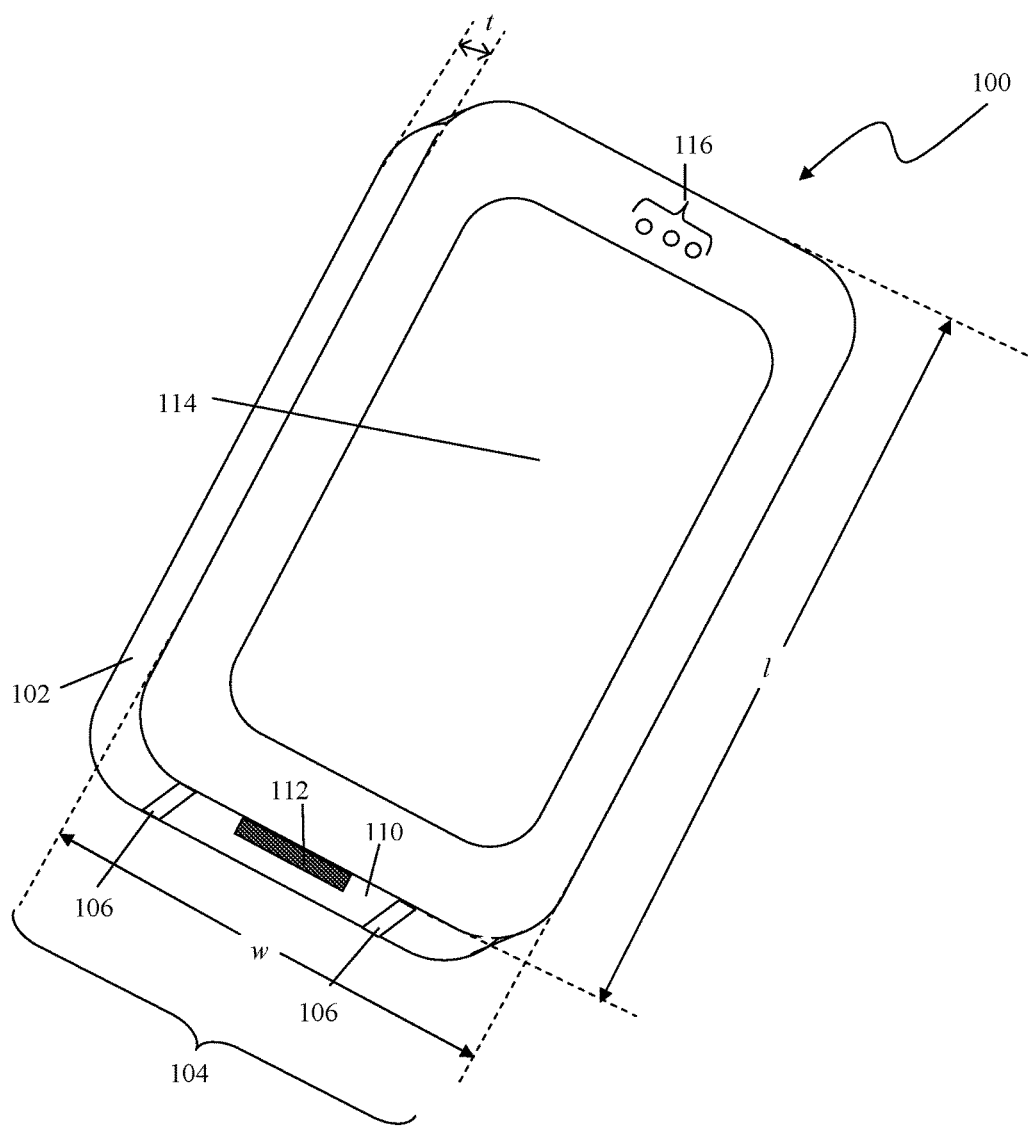
FIG. 1 is a schematic perspective view of an embodiment of a handheld wireless communication device comprising a slot antenna.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In some embodiments, some of the advantages of a slot antenna may include its size, design simplicity, robustness, and convenient adaptation. A substantial portion of a slot antenna may be placed on the external surface of a wireless communication device (e.g., in the form of an external ring), thereby reserving the internal space for other components. Such external slot antenna design may also be referred to as a strip antenna, and the two terms are used interchangeably herein. A slot antenna that is cavity-backed and circuit-fed does not require a waveguide, which further saves internal space of the device. Slot antennas are often used when greater control of the radiation pattern is desired. A cavity-backed and circuit-fed slot antenna may have a distinct directional radiation pattern, and the antenna's polarization may be substantially linear and vertical with respect to the direction of an EM wave.

Unfortunately, when the slot antenna aperture is obstructed or comes into contact with an electrical conductor, the EM signal transmission and reception may be disrupted or attenuated. For instance, in the context of a handheld wireless communications device (e.g., a cellular phone), a user's hand may act as an electrical conductor that shorts out the slot antenna, such as an external antenna ring. The air filling the aperture may act as an electrical insulator, e.g., a dielectric material, with an average electrical resistivity on the order of $10^{16}$ ohm meter (or a conductivity of about $10^{-15}$ siemen per meter). Human tissue, on the other hand, may be a relatively good electrical conductor compared to air and may have an electrical resistivity ranging approximately from about 0.5 to about 1.33 ohm meter (or a conductivity from about 0.75 to about 2.0 siemens per meter). A sweaty or wet hand may further increase the electrical conductivity and may short out the antenna upon contact with the hand, and thus cancel or attenuate the signal reception or transmission.

Even if the hand of a user of a handheld wireless communications device does not completely or significantly short out the antenna, human tissue contact with the device may still pose a safety concern. The Federal Communications Commission (FCC) has adopted limits for safe exposure to RF energy. These limits are given in terms of a unit referred to as the Specific Absorption Rate (SAR), which is a measure of the amount of radio frequency energy absorbed by the body when using a wireless communications device, e.g., a cellular phone or handset. The current FCC limit for a safe level of RF exposure from a cellular phone is an SAR level of about 1.6 watts per kilogram. The FCC mandates that any cellular phone sold within the United States have a SAR level at or below the FCC determined limit.

Disclosed herein is an antenna design, such as, for example, a slot antenna (or antenna ring) design, for a handheld wireless communications device, which may avoid substantial hand contact and thus may not suffer from significant attenuation due to hand contact. The slot antenna may also meet the FCC SAR requirement when the device is operated by a user. The slot antenna design may be implemented in a wireless communication device to transmit and receive RF signals. The wireless communication device may be a handheld device, such as a cellular phone. The wireless communication device may comprise a housing or a casing, a slot antenna, and antenna circuitry. In some embodiments, the housing may be at least partially constructed from an electrically conductive material. For example, in some embodiments, the housing may be a metallic housing or a partially metallic housing. In some embodiments, the housing may encompass a whole or a part of the wireless device and may comprise a substantially ring-like shape. In some embodiments, at least a bottom or a top portion of the housing may be a metallic structure to induce coupling to the slot antenna. As used herein, in some embodiments, the term housing may refer to a metallic housing or a partially metallic housing or a housing fabricated at least partially from an electrically conductive material. Also disclosed are a method for fabricating the handheld wireless communication device and a method for operating the handheld wireless communication device without the need to use a dielectric covering.

The wireless communications device may be any electronic device employing the disclosed slot antenna design. The wireless communication device may comprise various types of handheld or personal devices, such as portable two-way radio transceivers (i.e., "walkie-talkie"), cellular telephones, tablet computers, personal digital assistants (PDAs), laptop computers, wireless networking devices (e.g., routers), global positioning system units, garage door openers, wireless computer mice, wireless keyboards, wireless computer accessories, satellite television, wireless keys, and cordless telephones. This disclosure discusses various embodiments for the slot antenna design in a cellular telephone by way of example and not of limitation. A person having ordinary skill in the art would recognize that implementing the disclosed slot antenna design in any other type of wireless communication device is within the scope of this disclosure.

FIG. 1 illustrates an embodiment of a handheld wireless communication device 100. The wireless communication device 100 may comprise a housing 101. The housing 101 may be a casing that forms the external surface of the wireless communication device 100, and comprise a plurality of edges 102 along a perimeter of the wireless communication device 100. The edges 102 may include a bottom edge 104, two side edges, and a top edge opposite to the bottom edge 104. The bottom edge 104 may comprise any number of slots 106 (for instance two slots 106) and a conductive strip 110. The conductive strip 110 may comprise an external portion of the device's antenna, which may comprise an external portion and an internal portion. The external antenna portion may be coupled to an internal antenna portion (not shown) located inside the wireless communication device 100. The external antenna portion may be a slot antenna that extends along the edges 102 (as a ring) or a portion of the edges 102 (e.g., at the bottom edge 104). The conductive strip 110 of the slot antenna may extend between two slots 106 that are part of the slot antenna and adjacent to the conductive strip 110 on the bottom edge 104, as shown in FIG. 1. The wireless communication device 100 may also comprise one or more input/output (I/O) ports 112 that may be located on one external surface, e.g., along the edges 102, and one or more apertures 116 on a front panel 114 of the device. The apertures 116 may support a speaker or a microphone (not shown) that may be located inside the wireless communication device 100. The front panel 114 may comprise a touch screen panel and, optionally, a plurality of input buttons (e.g., a QWERTY keyboard). One or more input buttons (not shown) may be located on the edges 102 as well.

The shape of the housing 101 may vary according to the different designs, e.g., for different device types and/or manufacturers. The shape may be any three-dimensional shape, including a cube, cuboid, cylinder, cone, sphere, polyhedron, or prism. In one embodiment, the housing 101 may have a rectangular cuboid shape with smoothed corners. The dimensions of the housing 101 may also vary. In one embodiment, the cuboid shape may have a thickness (t) of about 10 millimeters, length (l) of about 110 millimeters, and width (w) of about 60 millimeters. In other embodiments, the dimensions of the housing 101 may have different values but with similar ratios as above or with different ratios. For instance, the shape of the housing 101 may be longer, wider, or thicker in comparison to the dimensions above for t, l, and w. The housing 101 may be made out of various materials, which may include plastic, fiber glass, rubber, and/or other suitable materials. For portable electronics, high-strength glass, polymers, and/or optionally light-weight metals (such as aluminum) may be used as part of the housing 101 to reduce the overall weight of the device.

If the front panel 114 is a touch screen panel, a polymer (such as poly(methyl methacrylate)) or high-strength glass with conductive coating may be used in the housing 101. The slot antenna around the edges 102 may be made of conductive material suitable for RF signal radiation, such as metallic material, as described in more detail below.

The slots 106 may have different shapes (e.g., circular, elliptical, or rectangular) of appropriate dimensions (e.g., diameter for circular perforation or width for a rectangular slot) to provide sufficient gap suitable for RF signal radiation. In one embodiment, the width of rectangular slots 106 may be about 5 millimeters. In another embodiment, the slots' width may be about 1 millimeter. For example, if the slots 106 are narrower than about 1 millimeter, the antenna performance may degrade. In one embodiment, the ratio of the width of the slots to the length or extent of the bottom edge 104 may be equal to about 1 to 60. Because the slots may consume a relatively small portion of the bottom edge 104, the chances of the slots 106 being covered by a user's hand may be reduced.

Figure 2:
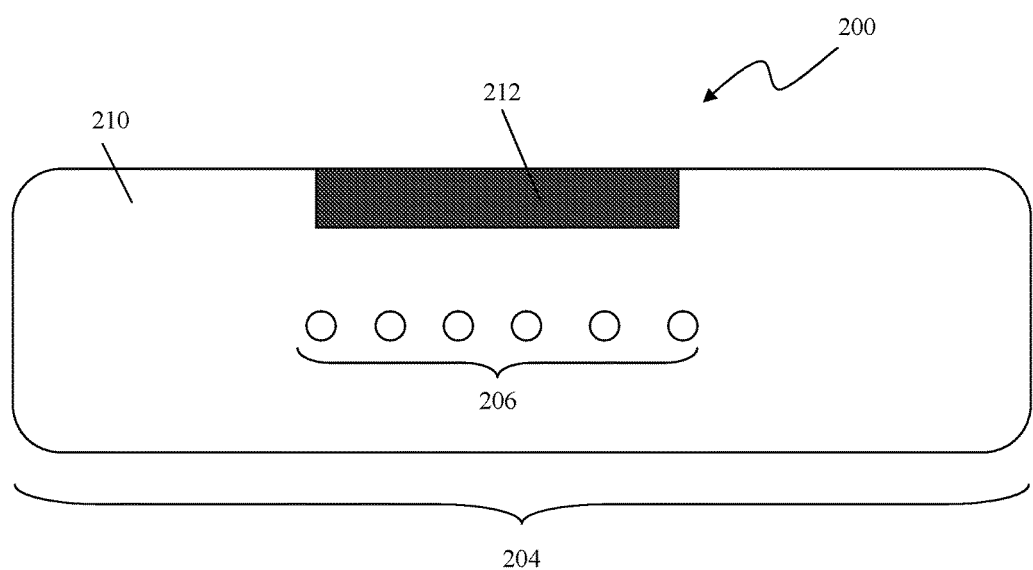
FIG. 2 is a schematic side view of an edge of an embodiment of a handheld wireless communication device comprising a slot antenna.

FIG. 2 shows a side view of a handheld wireless communication device 200 according to one embodiment. The wireless communication device 200 may be substantially similar to the wireless communication device 100. The wireless communication device 200 may comprise a conductive strip 210 located on a bottom edge 204 of the wireless communication device 200. The conductive strip 210 may be a portion of a slot antenna that may extend as a ring around the edges of the wireless communication device 200. The wireless communication device 200 may also comprise a plurality of slots or apertures 206 that may be positioned around the center surface area of the conductive strip 210 and may also be part of the slot antenna. The apertures 206 may be substantially circular or elliptical or may have any other suitable shape. The conductive strip 210 and the apertures 206 may be equivalent components to the conductive strip 110 and the slots 106, respectively, in the wireless communication device 100. The size of the conductive strip 210 and the shape of the apertures 206 (e.g., circular shape) may be configured to improve the RF signal radiation pattern and signal transmission/reception. The dimensions and the number of apertures 206 may also be determined to improve the signal radiation pattern.

It may be advantageous to place the RF-emitting components (e.g., conductive strip 210 and apertures 206) as far away from a user's body as possible to satisfy the FCC's SAR requirements. One of the optimal locations to place the conductive strip 210 is along the bottom edge 204 of the wireless communication device 200, which may be, for example, a cellular phone. The bottom edge 204 may correspond to the portion of the phone pointed toward the mouth of the user and generally away from the body. The use of a slot antenna, as opposed to other types of antenna (e.g., a dipole antenna), may also aid in directing the EM radiation away from a user's body because of the directional radiation pattern of a slot antenna.

The conductive strip 210 of the slot antenna may be an external component of the entire antenna of the wireless communication device 200, where internal parts of the antenna are not shown. The conductive strip 210 may comprise the apertures 206. In other embodiments, the conductive strip 210 may comprise slots instead of the apertures 206 that serve the same purpose and may be adjacent to the conductive strip 210, e.g., on opposite sides of the bottom edge 204. The apertures 206 may be perforations contained within the conductive strip 210. The conductive strip 210 may vary in size, e.g., according to the size of the bottom edge 204. For instance, the conductive strip 210 may comprise the entire width of the bottom edge 204.

The conductive strip can be fabricated using various conductive materials and fabrication methods. In one embodiment, the conductive strip may be manufactured by stamping out an appropriate size strip from a metal sheet. The metal sheet and the resultant conductive strip 210 may have electrical resistivity on the order of about 1 micro-ohm or lower, i.e., a conductivity of about 1 megasiemens per meter or higher. Some commonly known metals with electrical resistivity in such range are nickel-chromium alloy, stainless steel, titanium, and tungsten. In another embodiment, the metal sheet and the conductive strip may have electrical resistivity on the order of about 100 nano-ohm meter or lower, i.e., a conductivity of about 10 megasiemens per meter or higher. Some commonly known metals with electrical resistivity in such range are copper, aluminum, silver, gold, iron, platinum, tin, and nickel. Alternatively, the conductive strip may also be formed by flexible printed circuit technology using polyimide film that can be metalized. In another embodiment, the conductive strip may be formed by laser direct structuring technology using two-component molding technology. The molding components may be thermoplastics, where one component may be a plateable thermoplastic (with metal).

The wireless communication device 200 may also comprise one or more I/O ports 212, which may be similar to the I/O port 112. The I/O port 212 may be located along the bottom edge 204, e.g., adjacent and parallel to the conductive strip 210. The perimeter of the I/O ports 212 may be made of or coated with dielectric material to prevent conduction between the metal conductive strip 210 and the I/O ports 212 components, and thereby prevent any interference or attenuation of RF signals. A suitable dielectric material may have electrical resistivity on the order of about 10 mega-ohm meter or greater (or conductivity on the order of about 10 nanosiemens per meter or less). Such dielectric materials may include various polymers (e.g., polytetrafluoroethylene (PTFE) or polyethylene terephthalate (PET)), hard rubber, or tempered glass.

Figure 3:
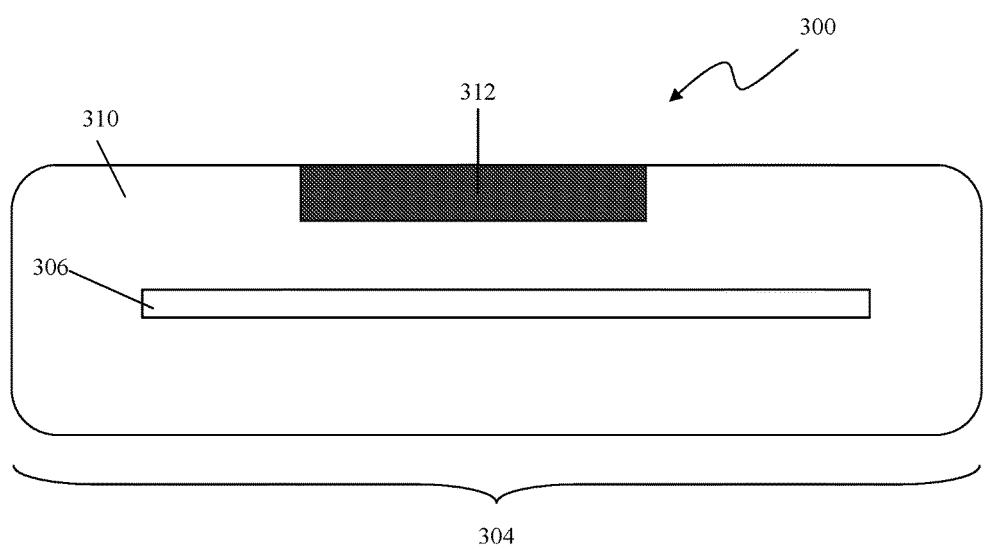
FIG. 3 is a schematic side view of an edge of an embodiment of a handheld wireless communication device comprising a slot antenna.

FIG. 3 shows a side view of a handheld wireless communication device 300 according to another embodiment. The wireless communication device 300 may be substantially similar to the wireless communication device 100. The wireless communication device 300 may comprise a conductive strip 310 located on a bottom edge 304 of the wireless communication device 300. The conductive strip 310 may be a portion of a slot antenna that may extend as a ring around the edges of the wireless communication device 300. The wireless communication device 300 may also comprise a slot 306 that may be positioned around the center area of the conductive strip 310 and may be part of the slot antenna. The slot 306 may be a rectangular aperture positioned along the conductive strip 310, and may extend parallel to the length of the conductive strip 310. The wireless communication device 300 may also comprise one or more I/O ports 312, which may be located along the bottom edge 304, e.g., adjacent and parallel to the conductive strip 310. The conductive strip 310, the slot 306, and the I/O port 312 may be equivalent components to the conductive strip 110 or 210, the slots 106 or apertures 206, and the I/O port 112 or 212, respectively.

Figure 4:
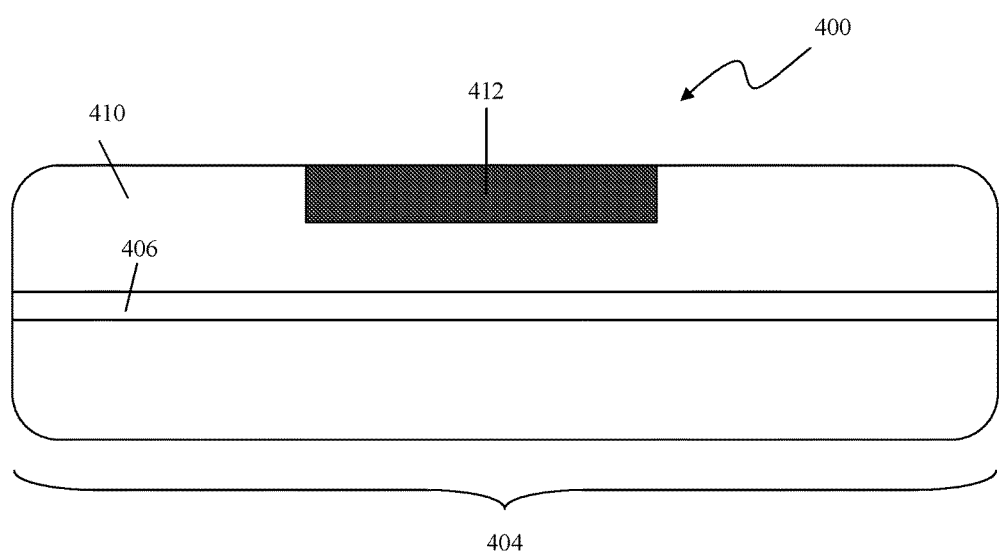
FIG. 4 is a schematic side view of an edge of an embodiment of a handheld wireless communication device comprising a slot antenna.

FIG. 4 shows a side view of a handheld wireless communication device 400 according to another embodiment. The wireless communication device 400 may be substantially similar to the wireless communication devices 100, 200, or 300. The wireless communication device 400 may comprise a conductive strip 410 of a slot antenna located on a bottom edge 404 of the wireless communication device 400. The wireless communication device 400 may also comprise a slot 406 that may be a rectangular aperture positioned around the center of the conductive strip 410 and may be part of the slot antenna. The orientation of the slot 406 may be parallel rather than perpendicular to the conductive strip 410 of the slot antenna. The slot 406 may extend along the bottom edge 404 as shown in FIG. 4. The wireless communication device 400 may also comprise one or more I/O ports 412, which may be located along the bottom edge 404, e.g., adjacent and parallel to the conductive strip 410. The conductive strip 410, the slot 406, and the I/O port 412 may be equivalent components to the conductive strip 110, 210, or 310, the slots or apertures 106, 206, or 306, and the I/O port 112, 212, or 312, respectively.

Figure 5:
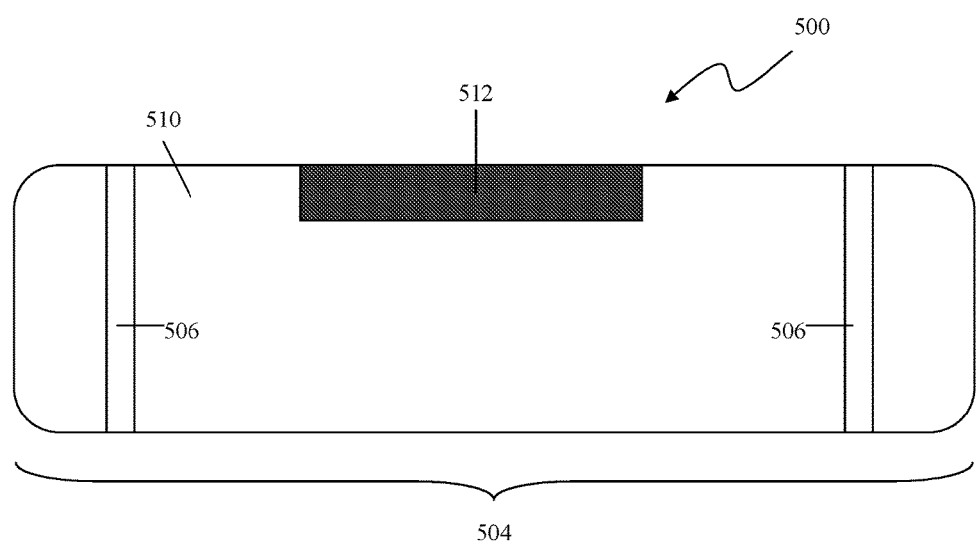
FIG. 5 is a schematic side view of an edge of an embodiment of a handheld wireless communication device comprising a slot antenna.

FIG. 5 shows a side view of a handheld wireless communication device 500 according to another embodiment. The wireless communication device 500 may be substantially similar to the wireless communication devices 100. The wireless communication device 500 may comprise a conductive strip 510 of a slot antenna located on a bottom edge 504 of the wireless communication device 500. The wireless communication device 500 may also comprise a plurality of slots 506 that may be rectangular apertures, which may be oriented perpendicular to the conductive strip 510 of the slot antenna, as shown in FIG. 5. The slots 506 may extend across the bottom edge 504. Alternatively, the slots 506 may be shorter rectangular apertures positioned within the bottom edge 504 (not shown). The wireless communication device 500 may also comprise one or more I/O ports 512, which be located along the bottom edge 504, e.g., adjacent and parallel to the conductive strip 510 of the slot antenna. The conductive strip 510, the slots 506, and the I/O port 512 may correspond to the conductive strip 110, 210, 310 or 410, the slots or apertures 106, 206, 306, or 406, and the I/O port 112, 212, 312, or 412, respectively.

Figure 6:
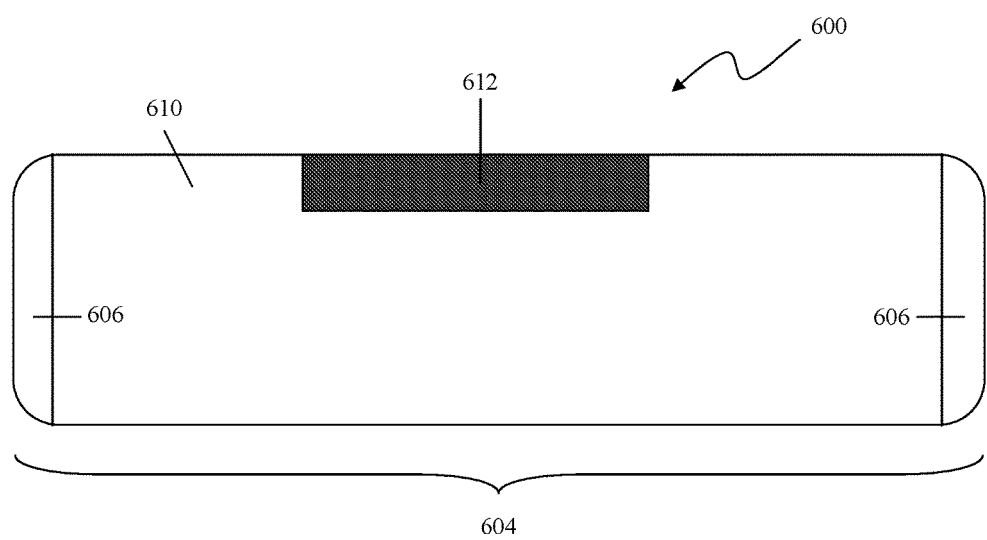
FIG. 6 is a schematic side view of an edge of an embodiment of a handheld wireless communication device comprising a slot antenna.

FIG. 6 shows a side view of a handheld wireless communication device 600 according to another embodiment. The wireless communication device 600 may be substantially similar to the wireless communication devices 100. The wireless communication device 600 may comprise a conductive strip 610 of a slot antenna located on the bottom edge 604 of the wireless communication device 600. The wireless communication device 600 may also comprise a plurality of slots 606 that may be rectangular apertures, which may be oriented perpendicular to the conductive strip 610 of the slot antenna. The slots 606 may extend across the bottom edge 604 as shown in FIG. 600. Alternatively, the slots 606 may be shorter rectangular apertures within the bottom edge 604 (not shown). Specifically, the slots 606 may be located at the two extreme ends of the bottom edge 604. At least a portion (corresponding to the slot antenna) of the side edges 602 (not shown) adjacent to the slots 606 may be made of suitable conductive material described above to facilitate proper EM radiation. The wireless communication device 600 may also comprise one or more I/O ports 612, which be located along the bottom edge 604, e.g., adjacent and parallel to the conductive strip 610 of the slot antenna. The conductive strip 610, the side edges 602, the slots 606, and I/O port 612 may be equivalent components to the conductive strip 110, 210, 310, 410, or 510, the side edge 102, the slots 106, 206, 306, 406, or 506, and the I/O port 112, 212, 312, 412, or 512, respectively.

Figure 7:
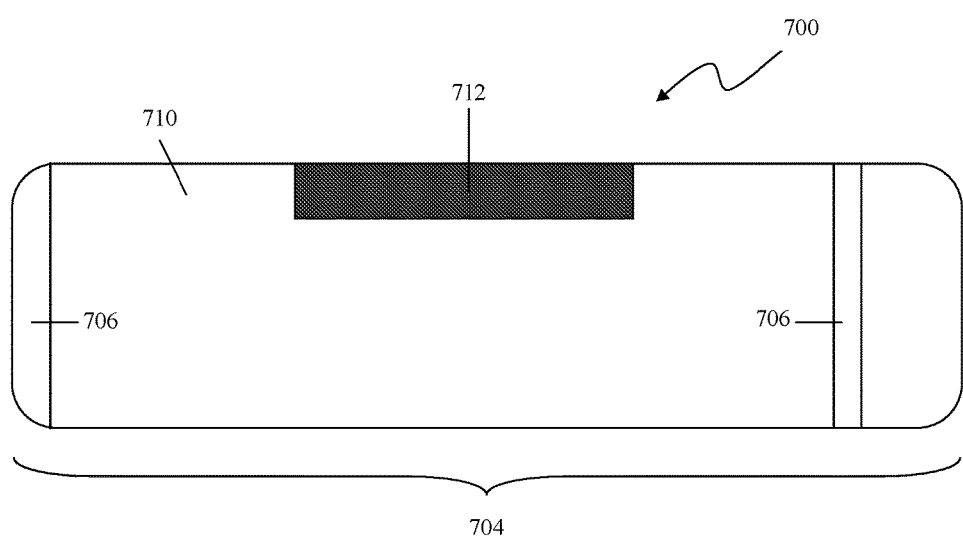
FIG. 7 is a schematic side view of an edge of an embodiment of a handheld wireless communication device comprising a slot antenna.

FIG. 7 shows a side view of a handheld wireless communication device 700 according to another embodiment. The wireless communication device 700 may be substantially similar to the wireless communication devices 100. The wireless communication device 700 may comprise a conductive strip 710 of a slot antenna located on a bottom edge 704 of the wireless communication device 700. The wireless communication device 700 may also comprise a plurality of slots 706 that may be rectangular apertures oriented perpendicular to the conductive strip 710. The slots 706 may extend across the bottom edge 704 (as shown) or may be shorter rectangular apertures within the bottom edge 704. Specifically, the slots 706 may be placed asymmetrically along the bottom edge 704. For example, one of the two slots 706 may be positioned at one extreme end of the bottom edge 704 and another slot 706 may be positioned at the other side of the bottom edge 704 but not at the opposite extreme end, as shown in FIG. 7. The wireless communication device 700 may also comprise one or more I/O ports 712, which may be located along the bottom edge 704, e.g., adjacent and parallel to the conductive strip 710 of the slot antenna. The conductive strip 710, the slots 706, and the I/O port 712 may be equivalent components to the conductive strip 110, 210, 310, 410, 510, or 610, the slots 106, 206, 306, 406, 506, or 606, and the I/O port 112, 212, 312, 412, 512, or 612, respectively.

Figure 8:
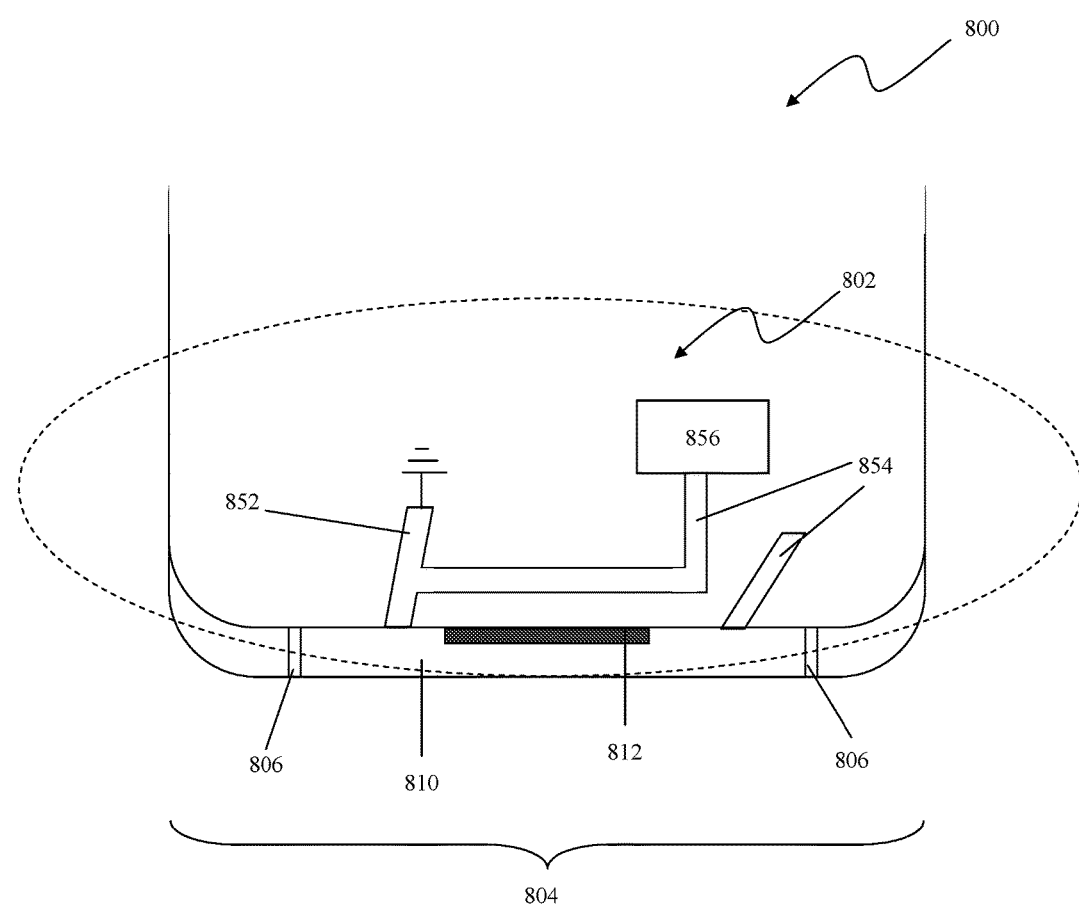
FIG. 8 is a schematic view of an embodiment of an internal portion of a slot antenna in a handheld wireless communication device.

FIG. 8 illustrates one embodiment of components of a slot antenna 802 in a wireless communication device 800. The slot antenna 802 may correspond to any of the slot antennas described above. The components of the slot antenna may comprise a ground lead 852 coupled to a grounding element for antenna circuitry 856, and one or more antenna feed connect leads 854 that may be coupled to an antenna circuitry 856. Both the ground lead 852 and the feed connect leads 854 may be located inside the wireless communication device 800 (e.g., under the casing), and may be coupled to the conductive strip 810 or the bottom edge 804. The slot antenna 802 may comprise a plurality of slots 806 that may be arranged and configured substantially similar to slots 706 in FIG. 7. The shape and size of the components may vary depending to the location of the antenna circuitry 856 and the internal space available within the wireless communication device 800. For instance, a cavity-backed and circuit-fed slot antenna may occupy a significantly smaller volume of the internal space of the wireless communication device 800. Such a slot antenna may not require the use of a waveguide because the RF frequency may be directly fed into the slot antenna by the antenna circuitry 856. Any other elements within the internal space of the device 800 that may conduct electricity may be placed away from the internal components of the slot antenna. Alternatively, a dielectric membrane may be placed between the antenna components and other electrically conductive elements to isolate the antenna components and prevent interference with the antenna signals.

Figure 9:
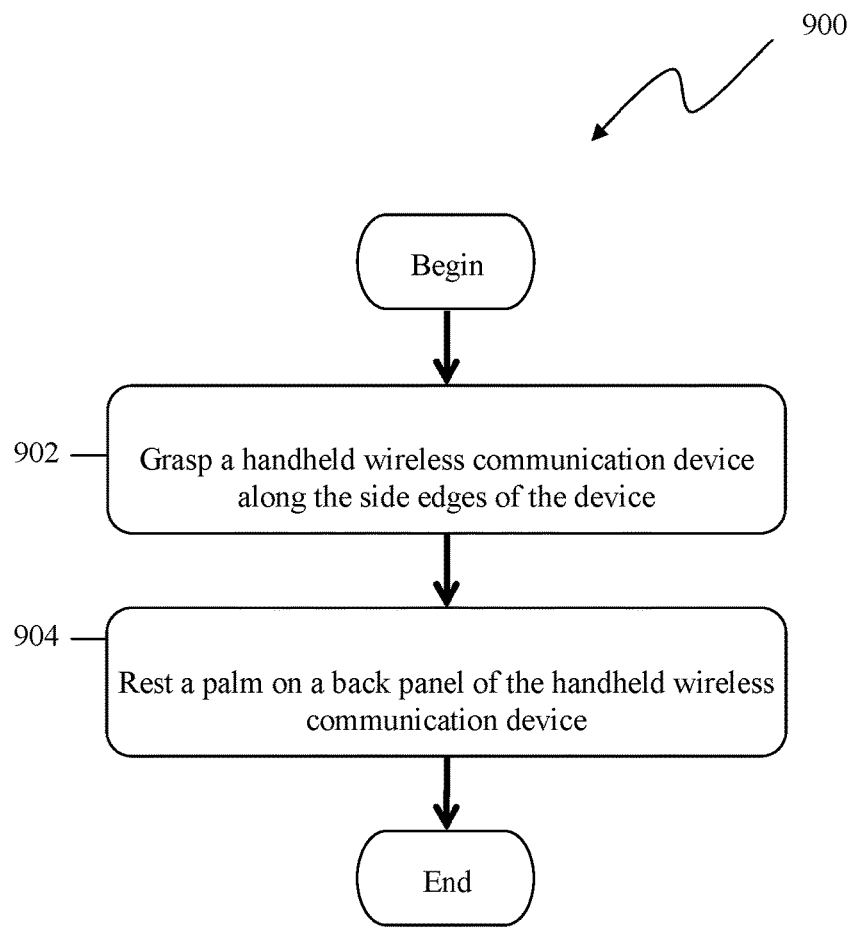
FIG. 9 is a flowchart of an embodiment of an operation method for a handheld wireless communication device.

FIG. 9 illustrates one embodiment of an operation method 900 for a handheld wireless communication device, which may be any of the wireless communication devices described above. In the exemplary context of a cellular telephone, the location of the apertures may affect the slot antenna performance. The operation method 900 may begin at block 902, where a handheld wireless communication device may be grasped by a user hand along the side edges of the device. At block 904, a palm of the user may rest on the back panel of the handheld wireless communication device (e.g., the back side of the housing 100 opposite the front panel 114). The operation method 900 may then end. When the cellular phone is handled and grabbed in such manner, a user hand may not touch or cover the bottom edge (e.g., the bottom edge 104) of the wireless communication device while operating the device. With respect to a slot antenna where the slots or apertures are located along the bottom edge, the operation method 900 may reduce the likelihood of loss or attenuation of RF antenna signals due to human tissue contact, which may act as a conductor that shorts out the slot antenna. One of the advantages of having a plurality of slots or apertures within or around the slot antenna (e.g., at the bottom edge of the device) is that the probability of all apertures being completely blocked by a user's hand is decreased. During a practical use of a cellular phone device, a user may typically hold the device in such a way that the hand does not cover any or at least some of the slots located along the bottom edge. If a user's hand happens to cover one of the slots, another slot (e.g., on the other end of the bottom edge) may still function (provide proper signal radiation) without being affected by the user's hand. In this regard, placing the two slots farther apart (e.g., at the bottom edge) may decrease the chances of a user's hand covering all slots or apertures of the external slot antenna portion, such as in the case of a metallic ring antenna around the edges of the device. Placing the slot or aperture at the bottom edge of the device may also obviate the need for placing a dielectric covering, such as rubber or plastic snap-on cover, over the housing or edges of the device to prevent shorting out the antenna by the user's hand or tissue contact.

In some embodiments, the slots or apertures may be filled or coated with a dielectric material. An aperture is ordinarily filled with air, which is a dielectric. Filling the gap with a solid dielectric or a fluid dielectric (gas, liquid, or gel), e.g., in a dielectric coating, may improve the aperture gap performance, e.g., due to further reduced conductivity. Alternatively, the gap and optionally the conductive strip around the gap may be coated to better protect the aperture gap from hand or tissue contact. In addition to placing the slot or aperture at the bottom edge of the device, filling or covering the gap by a dielectric (other than air) may further obviate the need for placing a dielectric covering over the housing or edges of the device to properly operating the device and send/receive wireless signals.

Figure 10:
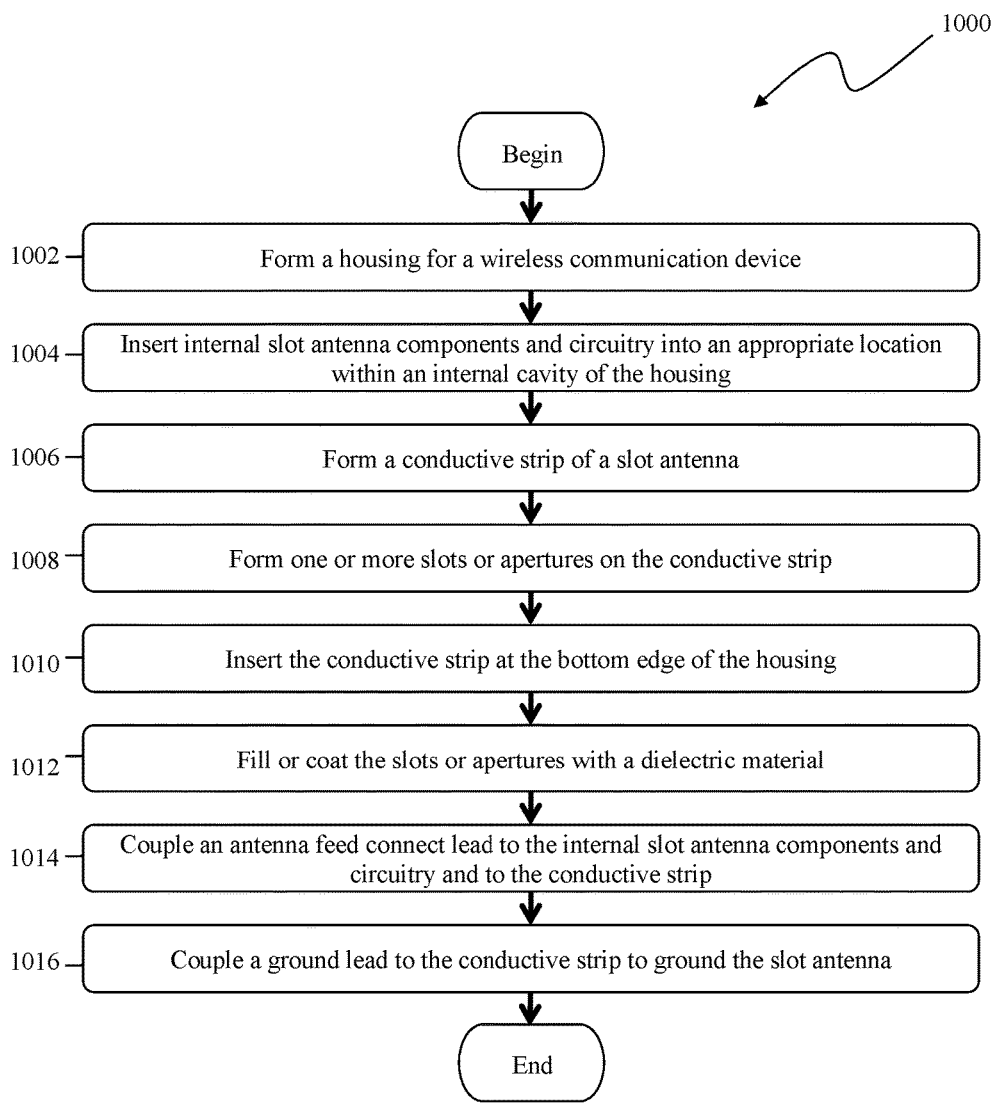
FIG. 10 is a flowchart of an embodiment of an assembly method for a handheld wireless communication device.

FIG. 10 illustrates one embodiment of an assembly method 1000 for a handheld wireless communication device, which may be any of the wireless communication devices described above. The assembly method 1000 may begin at block 1002, where a housing (e.g., the housing 101) may be formed for a wireless communication device. The housing may have an appropriate shape as described above, which may be achieved by various methods. For instance, if the housing is made from polymer, the desired shape may be formed by die casting, extrusion, injection molding, and/or compression molding. If the housing is made from high-strength glass, the desired shape may be formed by blowing, pressing, or using glass forming machines. If the housing is made from light-weight metals, the desired shape may be formed by casting, cold pressing a single sheet, or welding or soldering individual edges together. The housing may have a designated location for the internal components and circuitry (e.g., the internal components of the slot antenna of the wireless communication device 800). At block 1004, the internal slot antenna components and circuitry may be inserted into an appropriate location within an internal cavity of the housing.

At block 1006, a conductive strip of the slot antenna is formed, which may be accomplished by various methods. For instance, if the conductive strip is made from a metal sheet, the desired shape of the strip may be mechanically cut out from a sheet of metal with appropriate electrical conductivity, as described above. In one embodiment, the slot antenna, including the conductive strip, may be formed with the housing or casing in a combined process. In another embodiment, the conductive strip may be formed by using flexible printed circuit technology, e.g., by directly placing polyimide film on the surface of the bottom edge of the housing and subsequently metalizing the film. In another embodiment, the housing may be made with thermoplastic components of the two-component laser direct structuring technology, where one of the components may be subsequently plated with metal.

At block 1008, one or more slots or apertures may be formed on the conductive strip depending on the design of the slot antenna, e.g., as illustrated in FIGS. 2 to 7. For instance, the slots or apertures may be formed by removing an appropriately shaped portion of the conductive strip. At block 1010, the conductive strip may be inserted at the bottom edge of the housing. At block 1012, the slots or apertures in the conductive strip may be filled or coated with a dielectric material, which may have appropriate electrical conductivity as described above. At block 1014, an antenna feed connect lead may be coupled to the internal antenna components and circuitry and to the conductive strip. At block 1016, a ground lead may be coupled to the conductive strip to ground the slot antenna. The assembly method 1000 may then end.

In some embodiments, the antennas disclosed herein may operate, for example, at one or more frequencies within the range of 824 and 2690 megahertz. However, the antenna designs disclosed herein are not limited to these frequencies, but may be implemented to operate at other frequencies as well.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$ is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A wireless communication device comprising:
a housing comprising a plurality of edges, a front face, and a back face, wherein the plurality of edges comprise a top edge, a bottom edge, and two side edges, wherein the top edge and the bottom edge are shorter than the side edges; and
an antenna configured to receive and transmit wireless signals;
wherein a first edge of the housing comprises a conductive strip, a first slot, and a second slot, the conductive strip is located entirely between the first slot and the second slot and is a portion of the antenna, the first edge is the top edge or the bottom edge, and the first slot and the second slot extend across the first edge of the housing, starting from the front face of the housing and ending at the back face of the housing, wherein the first slot and the second slot are separated by the conductive strip and unconnected to each other, wherein a ratio of a width of each of the first slot and the second slot to a length of the first edge is in between $1/60$ and $1/12$.

2. The wireless communication device of claim 1, wherein the antenna comprises an antenna circuitry, and the antenna is configured to feed a radio frequency (RF) signal into the antenna circuitry without using a waveguide.

3. The wireless communication device of claim 1, wherein the first edge is made of a metallic material.

4. The wireless communication device of claim 1, further comprising an input/output (I/O) port adjacent to the first edge of the housing, wherein the first slot and the second slot are located symmetrically on two sides of the I/O port along the first edge.

5. The wireless communication device of claim 1, further comprising an input/output (I/O) port adjacent to the first edge of the housing, and wherein the first slot and the second slot are located asymmetrically along the first edge and having different distances to the I/O port.

6. The wireless communication device of claim 1, wherein a width of each of the first slot and the second slot is in a range from 1 millimeter to 5 millimeters.

7. The wireless communication device of claim 1, wherein the conductive strip is a stamped metal piece that has an electrical resistivity less than or equal to one micro-ohm meter.

8. The wireless communication device of claim 1, wherein the first slot and the second slot are filled with a nonconductive material.

* * * * *